United States Patent
Paiuk

(10) Patent No.: US 12,425,545 B1
(45) Date of Patent: Sep. 23, 2025

(54) MULTI-STEP ENABLEMENT OF MEDIA INPUT DEVICES DURING VIRTUAL CONFERENCES

(71) Applicant: Zoom Video Communications, Inc., San Jose, CA (US)

(72) Inventor: Alejandro Martin Paiuk, West Hartford, CT (US)

(73) Assignee: Zoom Communications, Inc., San Jose, CA (US)

( * ) Notice: Subject to any disclaimer, the term of this patent is extended or adjusted under 35 U.S.C. 154(b) by 260 days.

(21) Appl. No.: 18/219,859

(22) Filed: Jul. 10, 2023

(51) Int. Cl.
*H04N 7/15* (2006.01)
*H04L 65/403* (2022.01)
*H04N 7/14* (2006.01)

(52) U.S. Cl.
CPC .......... *H04N 7/152* (2013.01); *H04L 65/403* (2013.01); *H04N 7/147* (2013.01)

(58) Field of Classification Search
None
See application file for complete search history.

(56) References Cited

U.S. PATENT DOCUMENTS

| | | | | |
|---|---|---|---|---|
| 5,886,734 | A * | 3/1999 | Ozone | H04N 7/15 348/E7.083 |
| 2012/0244836 | A1* | 9/2012 | Colbert | H04L 12/1822 455/411 |
| 2017/0078473 | A1* | 3/2017 | DeLuca | H04M 1/724 |
| 2023/0076595 | A1* | 3/2023 | Baselga | G06Q 10/101 |
| 2023/0247097 | A1* | 8/2023 | Johnson | H04L 51/046 |
| 2024/0371373 | A1* | 11/2024 | Munro | G10L 21/0208 |

* cited by examiner

*Primary Examiner* — Quoc D Tran
(74) *Attorney, Agent, or Firm* — Kilpatrick Townsend & Stockton, LLP

(57) ABSTRACT

Systems and methods for enabling a media input device configured with multi-step enablement are disclosed. A client device joins a video conferencing session and disables a media input device at the client device. A setting of multi-step enablement for the media input device is activated during the video conferencing session. The client device generates a prompt for a subsequent enabling action in response to an initial enabling action during the video conferencing session. The client device compares a received subsequent action to a reference answer corresponding to the prompt to generate an enabling decision. The client device enables the media input device in response to the enabling decision if the received subsequent action matches the reference answer corresponding to the prompt.

20 Claims, 9 Drawing Sheets

MULTI-STEP ENABLEMENT OF MEDIA INPUT DEVICES DURING VIRTUAL CONFERENCES

FIELD

The present application generally relates to virtual conferencing and more specifically relates to multi-step enablement of media input devices during virtual conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
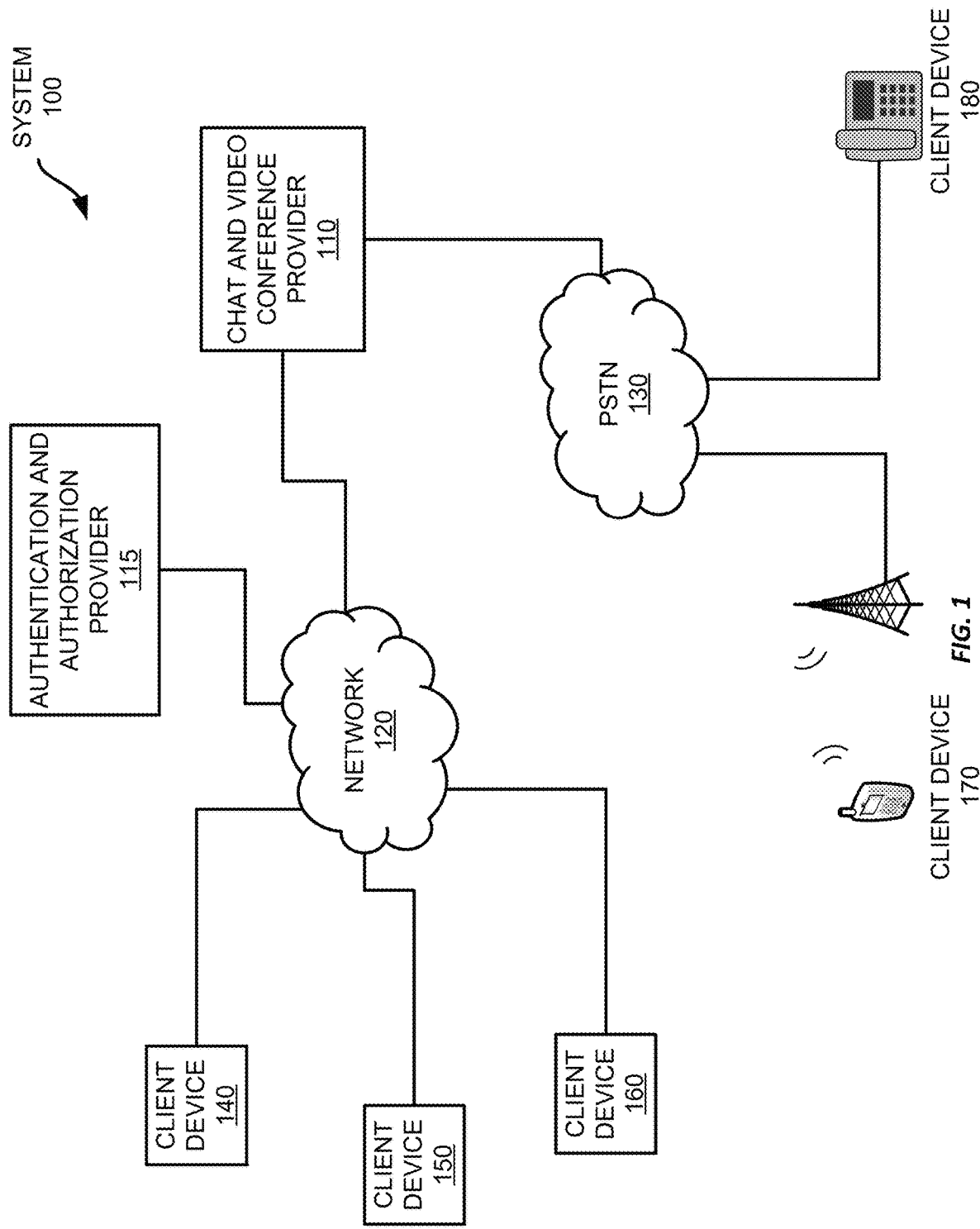
FIG. 1 shows an example system that provides videoconferencing functionality to various client devices.

Examples are described herein in the context of multi-step enablement of media input devices during virtual conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

In virtual conferences, participants usually have the option to turn on or off their camera or microphone. In certain situations, a meeting participant opts to turn their camera and microphone off because what may be captured on camera or microphone is sensitive, private, or confidential. Thus, it is important to ensure that the camera or microphone is not turned on accidentally to avoid leaking of sensitive, private, or confidential information or unintentional sharing of private activities or conversations. For example, in a video-enabled contact center, the video stream may by asymmetric. That is, the contact agent has camera and microphone on to better serve the consumer. The consumer can benefit from being able to see the contact agent, but oftentimes they do not want to reciprocate for various reasons. For example, the consumer may be calling in their free time and multitasking. In some cases, the consumer may want to use the restroom, talk privately, or do or say something off microphone and/or off-camera that they would be embarrassed to share with the contact agent. Under normal circumstances, if a consumer is using a touch screen device, it is relatively easy to accidentally press the wrong button, unintentionally press a button while carrying a portable device in hand (or in a pocket, purse, or elsewhere), or have a bystander or object press the button without the user's knowledge or intent.

To prevent cameras and microphones from being turned on inadvertently, it is desirable for a communication platform to provide a multi-step enablement functionality for media input devices on a client device. For example, the communication platform provides a communication software application including a setting for multi-step enablement of media input devices, such as camera or microphone.

In an example, a user joins a video conferencing session via a client device which has installed a communication software application provided by a communication platform. The user elects to turn off the camera and mute the microphone to disable media input from the client device. To prevent accidentally turning on the camera or microphone, the user may activate a setting of multi-step enablement for the camera and the microphone during the video conferencing session.

During the video conferencing session, the user may accidentally click or touch a button for the camera or microphone in a graphical user interface (GUI) of the video conferencing session on the client device. The accidental clicking or touching is an initial enabling step, which triggers a prompt for a subsequent enabling step. The prompt can be displayed via the GUI of the video conferencing session on the client device. Alternatively, or additionally, the prompt can be an audio played from the client device to the user. For example, when a user touches the microphone button, a prompt is generated and displayed in the GUI, stating "In order to unmute the microphone, please clap 3 times to the microphone."

The user provides corresponding information based on the prompt. The client device can compare the information provided by the user based on a reference answer corresponding to the prompt to generate an enabling decision. If the information provided by the user matches the answer corresponding to the prompt, the enabling decision is to enable the media input device. The client device then enables the media device based on the enabling decision. Following the example above, the user reads the prompts displayed in the GUI, and claps 3 times to a microphone associated with the client device accordingly. The client device receives the clapping sound 3 times via the microphone and determines that the received sounds match the answer corresponding to the prompt. Then the client device unmutes the microphone.

If the information received by the client device from the user does not match the answer corresponding to the prompt, the enabling decision is not to enable the media input device. The client device then will not enable the media input device even though the button for the media input device was initially clicked or touched. If the user indeed intends to turn on the camera or microphone, the user may click or touch the camera or microphone button again and another prompt for a subsequent enabling step can be generated and displayed, the user can consciously provide the correct information to enable the camera or microphone.

In some examples, a camera view is displayed on the client device before the camera is turned on based on the enabling decision to show the user the camera view that will be shown to other participants in the video conferencing session. This provides an opportunity for the user to adjust the camera view. The user can confirm the camera view so that the camera is turned on.

Thus, this example provides a multi-step enablement functionality for media input devices on a client device. The multi-step enablement functionality works as a "safety lock" for the camera and/or microphone to eliminate the risk of the camera and/or microphone being inadvertently turned on. The "safety lock" feature could provide extra enabling steps to prevent inadvertent enabling of the microphone and/or camera. Meanwhile, the extra enabling steps are hurdles that can be navigated easily by a user if the user indeed intends to turn on the camera or microphone.

This illustrative example is given to introduce the reader to the general subject matter discussed herein and the disclosure is not limited to this example. The following sections describe various additional non-limiting examples and examples of multi-step enablement of media input devices during virtual conferences.

Referring now to FIG. 1, FIG. 1 shows an example system 100 that provides videoconferencing functionality to various client devices. The system 100 includes a chat and video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a chat and video conference provider 110 may supply components to enable a private organization to host private internal video conferences or to connect its system to the chat and video conference provider 110 over a public network.

The system optionally also includes one or more authentication and authorization providers, e.g., authentication and authorization provider 115, which can provide authentication and authorization services to users of the client devices 140-160. Authentication and authorization provider 115 may authenticate users to the chat and video conference provider 110 and manage user authorization for the various services provided by chat and video conference provider 110. In this example, the authentication and authorization provider 115 is operated by a different entity than the chat and video conference provider 110, though in some examples, they may be the same entity.

Figure 2:
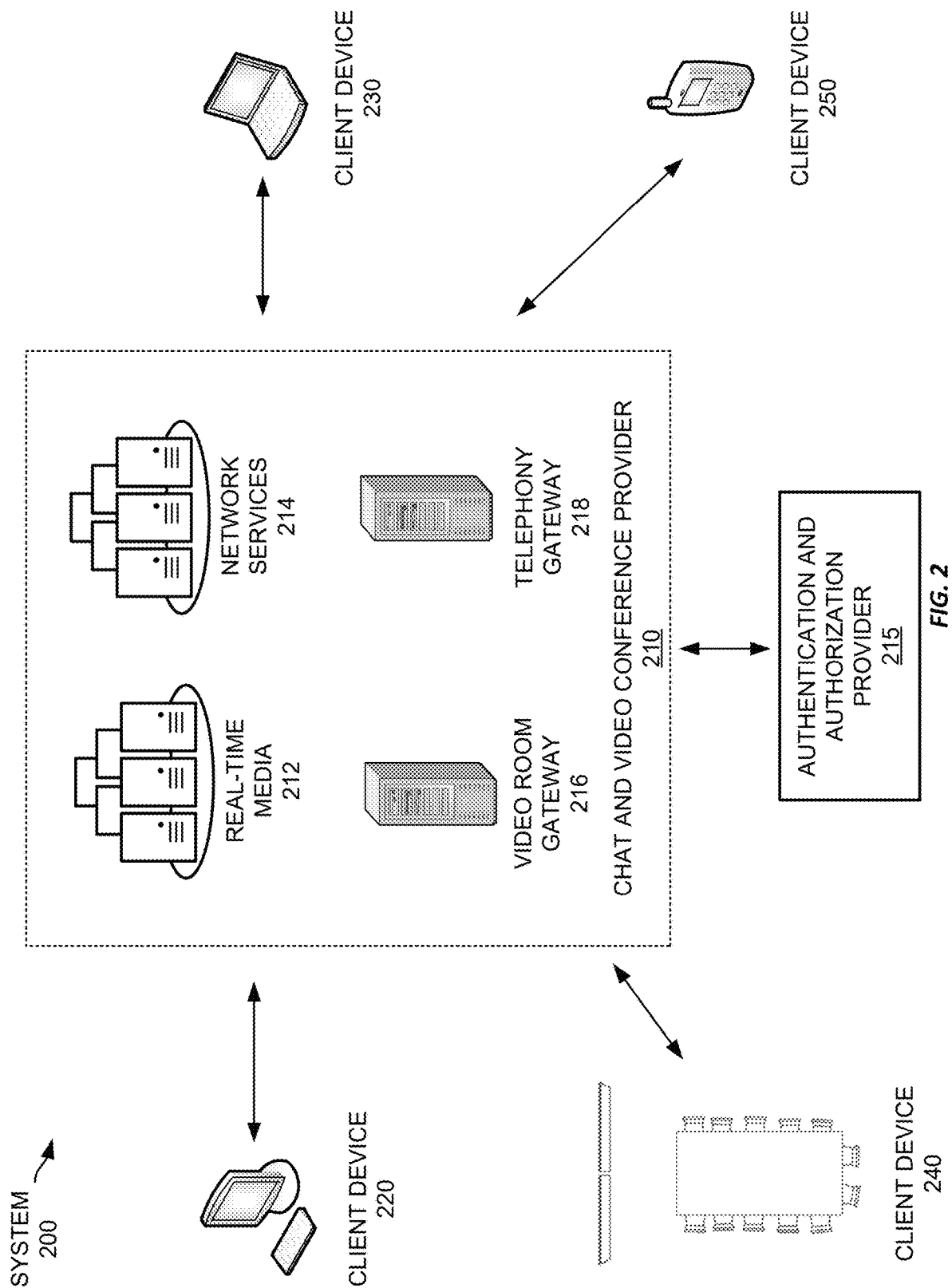
FIG. 2 shows an example system in which a chat and video conference provider provides videoconferencing functionality to various client devices.

Chat and video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example chat and video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or a client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started, or the host may be required to specifically admit one or more of the users.

During the meeting, the participants may employ their client devices 140-180 to capture audio or video information and stream that information to the chat and video conference provider 110. They also receive audio or video information from the chat and video conference provider 110, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communication devices that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and are not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user authentication information, meeting identifiers, meeting passwords or passcodes, etc. In examples that employ an authentication and authorization provider 115, a client device, e.g., client devices 140-160, may operate in conjunction with an authentication and authorization provider 115 to provide authentication and authorization information or other user information to the chat and video conference provider 110.

An authentication and authorization provider 115 may be any entity trusted by the chat and video conference provider 110 that can help authenticate a user to the chat and video conference provider 110 and authorize the user to access the services provided by the chat and video conference provider 110. For example, a trusted entity may be a server operated by a business or other organization with whom the user has created an account, including authentication and authorization information, such as an employer or trusted third-party. The user may sign into the authentication and authorization provider 115, such as by providing a username and password, to access their account information at the authentication and authorization provider 115. The account information includes information established and maintained at the authentication and authorization provider 115 that can be used to authenticate and facilitate authorization for a particular user, irrespective of the client device they may be using. An example of account information may be an email account established at the authentication and authorization provider 115 by the user and secured by a password or additional security features, such as single sign-on, hardware tokens, two-factor authentication, etc. However, such account information may be distinct from functionality such as email. For example, a health care provider may establish accounts for its patients. And while the related account information may have associated email accounts, the account information is distinct from those email accounts.

Thus, a user's account information relates to a secure, verified set of information that can be used to authenticate and provide authorization services for a particular user and should be accessible only by that user. By properly authenticating, the associated user may then verify themselves to other computing devices or services, such as the chat and video conference provider 110. The authentication and authorization provider 115 may require the explicit consent of the user before allowing the chat and video conference provider 110 to access the user's account information for authentication and authorization purposes.

Once the user is authenticated, the authentication and authorization provider 115 may provide the chat and video conference provider 110 with information about services the user is authorized to access. For instance, the authentication and authorization provider 115 may store information about user roles associated with the user. The user roles may include collections of services provided by the chat and video conference provider 110 that users assigned to those user roles are authorized to use. Alternatively, more or less granular approaches to user authorization may be used.

When the user accesses the chat and video conference provider 110 using a client device, the chat and video conference provider 110 communicates with the authentication and authorization provider 115 using information provided by the user to verify the user's account information. For example, the user may provide a username or cryptographic signature associated with an authentication and authorization provider 115. The authentication and authorization provider 115 then either confirms the information presented by the user or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide authentication information to authenticate the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide account information to the chat and video conference provider 110, even in cases where the user could authenticate and employs a client device capable of authenticating the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to chat and video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a chat and video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a chat and video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more authentication and authorization providers 215, which can authenticate various users to the chat and video conference provider 210 generally as described above with respect to FIG. 1.

In this example, the chat and video conference provider 210 employs multiple different servers (or groups of servers) to provide different examples of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting an authentication and authorization provider 215 to verify the provided credentials. Once the user's credentials have been accepted, and the user has consented, the network services servers 214 may perform administrative functionality, like updating user account information, if the user has account information stored with the chat and video conference provider 210, or scheduling a new meeting, by interacting with the network services servers 214. Authentication and authorization provider 215 may be used to determine which administrative functionality a given user may access according to assigned roles, permissions, groups, etc.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may select a user to remove and issue a command through a user interface on their client device. The command may be sent to a network services server 214, which may then disconnect the selected user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have been completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosted by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio streams to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
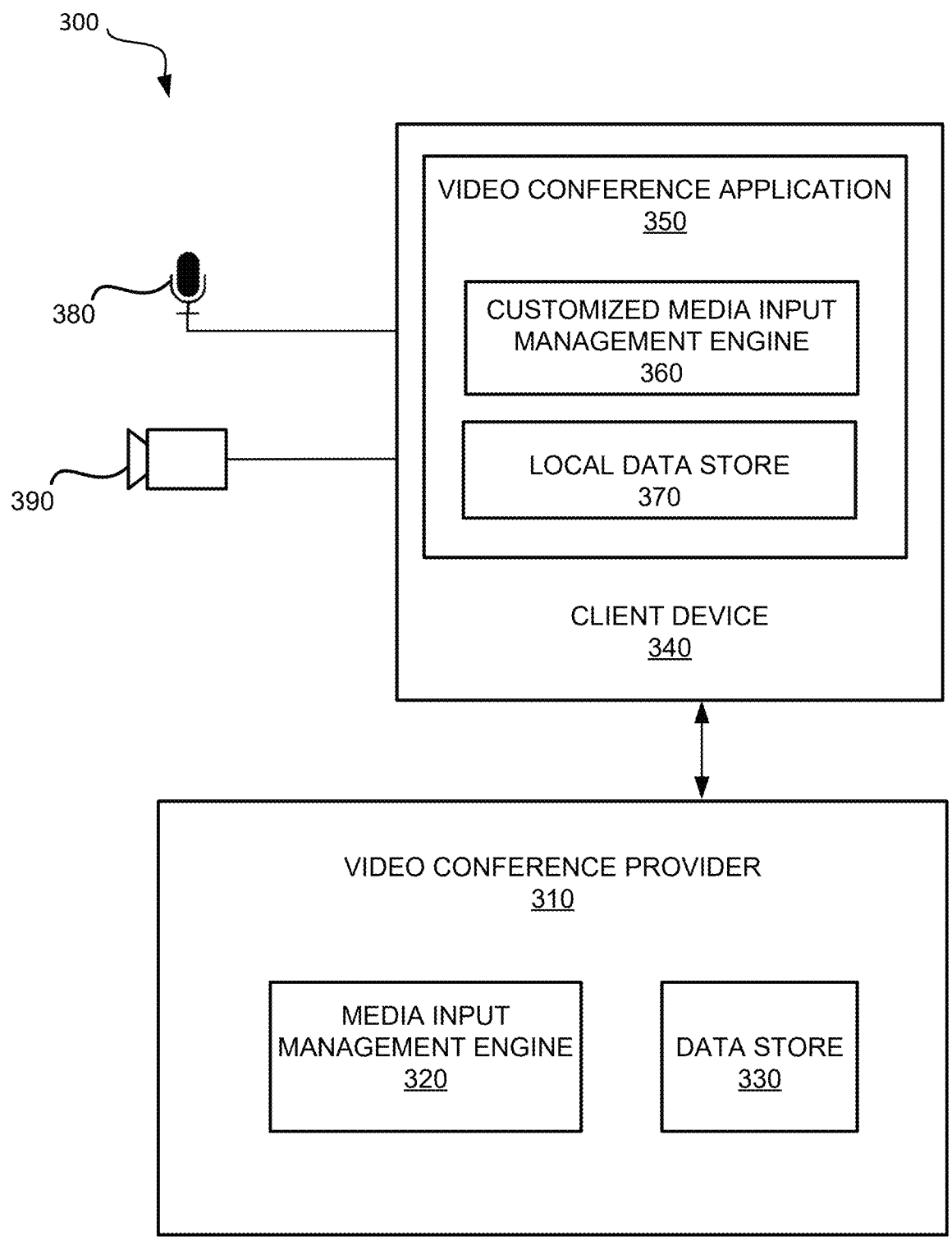
FIG. 3 shows an example system configured to provide multi-step enablement of media input during video conferences.

Referring now to FIG. 3, FIG. 3 shows an example system 300 configured to provide multi-step enablement of media input devices during video conferences. A client device 340 is in network communication with a chat and video conference provider 310. The chat and video conference provider 310 can be the chat and video conference provider 110 in FIG. 1 or the chat and video conference provider 210 in FIG. 2. The client device 340 can be a client device (e.g., 140, 150, 160, or 170) in FIG. 1 or a client device (e.g., 220, 230, or 250) in FIG. 2. The client device 340 is installed with a video conference application 350 provided by the chat video conference provider 310. The video conference application 350 provides a GUI for the user to interact with other users during video conferencing sessions established by the chat video conference provider 310, for example via the GUIs in FIG. 4-7 as will be described below. The client device 340 also includes a microphone 380 and a camera 390, which can be individual devices connected to the client device 340. Alternatively, or additionally, the microphone 380 or the camera 390 can be integrated or embedded in the client device 340. A user can control the input from the microphone 380 or the camera via the video conference application 350 during video conferencing sessions.

The video conference application 350 includes a customized media input management engine 360 and a local data store 370. The customized media input management engine 320 is configured to manage the settings for media input devices associated with the client device 340. For example, one setting is about multi-step enablement for a media input device (e.g., camera 390 or microphone 380). If activated, the media input device on a client device 340 can be enabled with at least one extra step besides initial clicking or touching the camera or microphone button in a GUI of the video conference application 350. The customized media input management engine 360 can include multiple options for the at least one extra step. The customized media input management engine 360 may display the multiple available options to a user for selection. The user may select one or more of the available options as the at least one extra step.

The one or more options may need additional information from the user to be set up as the at least one extra step. For example, if the option is a security question, the customized media input management engine 360 can request the user to select one or more security questions and provide corresponding answers. Also, for example, if the extra step is a security code, the customized media input management engine 360 can request the user to select a communication channel (e.g., via email, via text, or via phone call) and provide the corresponding contact information (e.g., email address, phone number). Some options may not require additional information from the user, beside a selection. For example, a Completely Automated Public Turing Test to tell Computers and Humans Apart (CAPTCHA) question or a pattern tracing task can be generated by the media input management engine 320 as an extra step without the user providing any additional information. Some options may allow the user to provide information, but not required. For example, if the extra step is to show certain information in front of camera or make certain sound patterns to the microphone, the user may preselect specific information to show in front of the camera or specific sound patterns to make to the microphone.

In some examples, the customized media input management engine 360 is configured to select an extra step from the at least one extra step the user has pre-specified randomly or based on an order specified by the user, triggered by an initial activation attempt by the user (e.g., clicking or touching the camera or microphone button either inadvertently or not). The customized media input management engine 360 is configured to generate a prompt for the extra step for enabling the media input. The customized media input management engine 360 also includes a reference answer corresponding to the prompt. The prompt can be displayed in a GUI on the client device associated with the user.

In some examples, the extra step is to answer a CAPTCHA question. The prompt then shows a CAPTCHA question. An example CAPTCHA question can be "select all the pictures with motorcycles."

In some examples, the extra step is to draw a particular pattern. The prompt then shows a request for the user to draw a particular pattern. For example, the prompt asks the user to trace a specific pattern shown on the client device.

In some examples, the extra step is to provide a security code. The prompt then shows a request for typing a particular code. The code may be sent via a text message or an email.

In some examples, the extra step is to answer a security question. The prompt then shows a security question preselected by the user. The user may have selected one or more security questions and saved the corresponding answers. When an accidental touch of the camera button or the microphone button triggers a subsequent enabling step, one of the one or more security questions can be displayed in the GUI via the client device 340.

In some examples, the extra step is to show particular information in front of the camera. The prompt then shows a request for showing the particular information in front of the camera associated with the client device. The particular information can be a gesture, a movement, a facial expression, an object, a written symbol, a written number, or a written word.

In some examples, the extra step is to make a particular sound pattern. The prompt then shows a request for making a particular sound pattern to the microphone 380 associated with the client device 340. The sound pattern can be a specific word. The sound pattern can also be a specific sound (e.g., snapping, drumming, whistling, or clapping certain times). The word or sound can be randomly selected by the communication platform and displayed on the client device. Alternatively, the word can be preselected and saved by the user in the settings.

The customized media input management engine 360 is configured to receive and process user input from the client device 340 following the prompt to generate an enabling decision. If the user input matches the reference answer corresponding to the prompt, the enabling decision is to enable the media input. The customized media input management engine 360 then enables the camera 390 or microphone 380. If the user input does not match the prompt, the enabling decision is not to enable the media input device. The customized media input management engine 360 then does not enable the camera 390 or microphone 380 following the initial activation attempt by the user.

When the video conference application 350 is first installed on the client device 340 associated with a user, the initial media input management engine includes a set of general-purpose options for extra steps for enabling media input devices. However, the user associated with the client device 340 may select certain options and provide specific information for extra steps based on the user preference. For example, the user does not like to answer CAPTCHA questions, the CAPTCHA option may be disabled as an option for an extra step for enabling the media input devices. Thus, the media input management engine in the video conference application 350 becomes a customized engine for the client device 340.

The local data store 370 stores setting data about multi-step enablement for media input, option data about extra steps for enabling media input devices, initial activation attempt data (e.g., time, means (e.g., clicking, or touching)), extra step data (e.g., prompts and corresponding reference answers), user input data for the extra step, enabling decision data, etc. In addition, the local data store 370 also maintains a log recording the initial attempts and extra steps triggered for enabling media input devices associated with the client device 340.

In some examples, the chat video conference provider 310 includes a media input management engine 320, even if the video conference application installed on a client device 340 includes a customized media input management engine 360 for the client device 340. The media input management engine 320 has functions similar to the customized media input management engine 360 as described above but manages media input from client devices at the server level.

The chat video conference provider 310 also includes a data store 330. Similar to the types of data stored in a local data store 370 on the video conference application 350 installed on a client device 340, the data store 330 can store those types of data for multiple users associated with the chat video conference provider 310.

Figure 4:
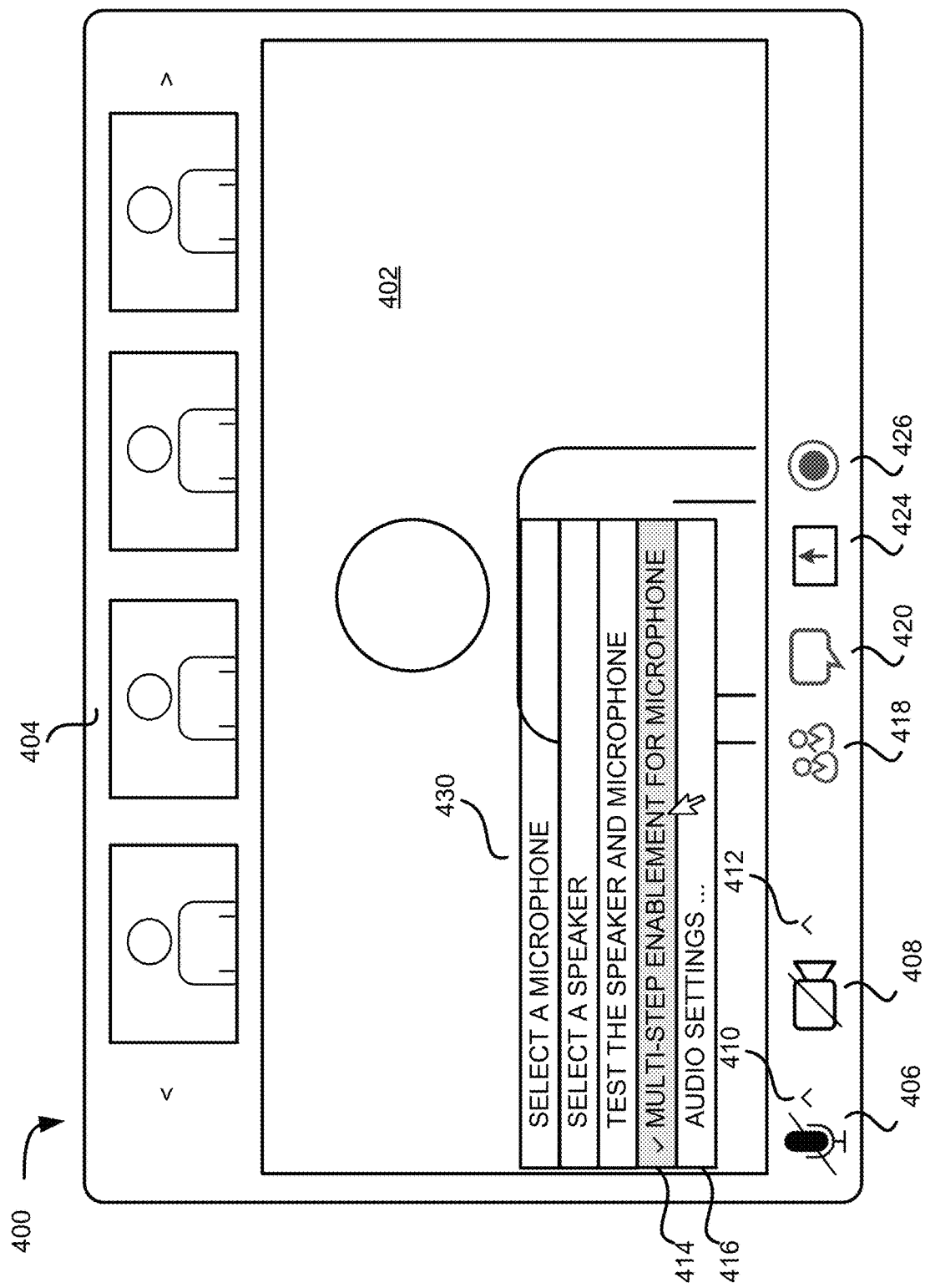
FIG. 4 is an example GUI of a video conferencing session displaying that a setting of multi-step enablement for microphone is activated.

Referring now to FIG. 4, FIG. 4 is an example GUI 400 of a video conferencing session displaying that a setting of multi-step enablement for microphone is activated. The GUI 400 includes a speaker window 402 and participant window 404. The speaker window 402 and participant window 404 can be arranged in different formats, such as in a speaker view as currently shown in GUI 400 or a gallery view where multiple participants' camera views are displayed in congruent boxes, etc. The GUI 400 also includes a microphone button 406 and a camera button 408. A caret symbol 410 is at the upper right corner of the microphone button 406. When clicked, a dropdown menu 430 can be displayed.

The dropdown menu 430 can include various options for the microphone. An option 414 is for multi-step enablement for microphone. The option 414 can be toggled on or off for activating or deactivating the multi-step enablement for microphone. When the option 414 is toggled as shown in FIG. 4, the multi-step enablement for microphone is activated. That is, when the microphone is muted, more than one step is needed to unmute the microphone. Option 416 includes more settings for the microphone. A user may select or set specific extra steps for enabling (e.g., unmuting) the microphone when the microphone is disabled (e.g., muted). Similarly, a caret symbol 412 is at the upper right corner of the camera button 408. The caret symbol 412 can also be clicked to show a dropdown menu including various options for the camera, which will be described in FIG. 5. The GUI 400 also includes other interactive elements, for example interactive elements 418, 420, 424, and 426. Interactive element 418 can be activated to show a list of participants in the video conferencing session. Interactive element 420 can be activated to send a chat message to some or all of the participants in the video conferencing session. Interactive element 424 can be activated to share screen. Interactive element 426 can be activated to record the video conferencing session. Other interactive elements may also be included in the GUI 400, but are not shown here.

Figure 5:
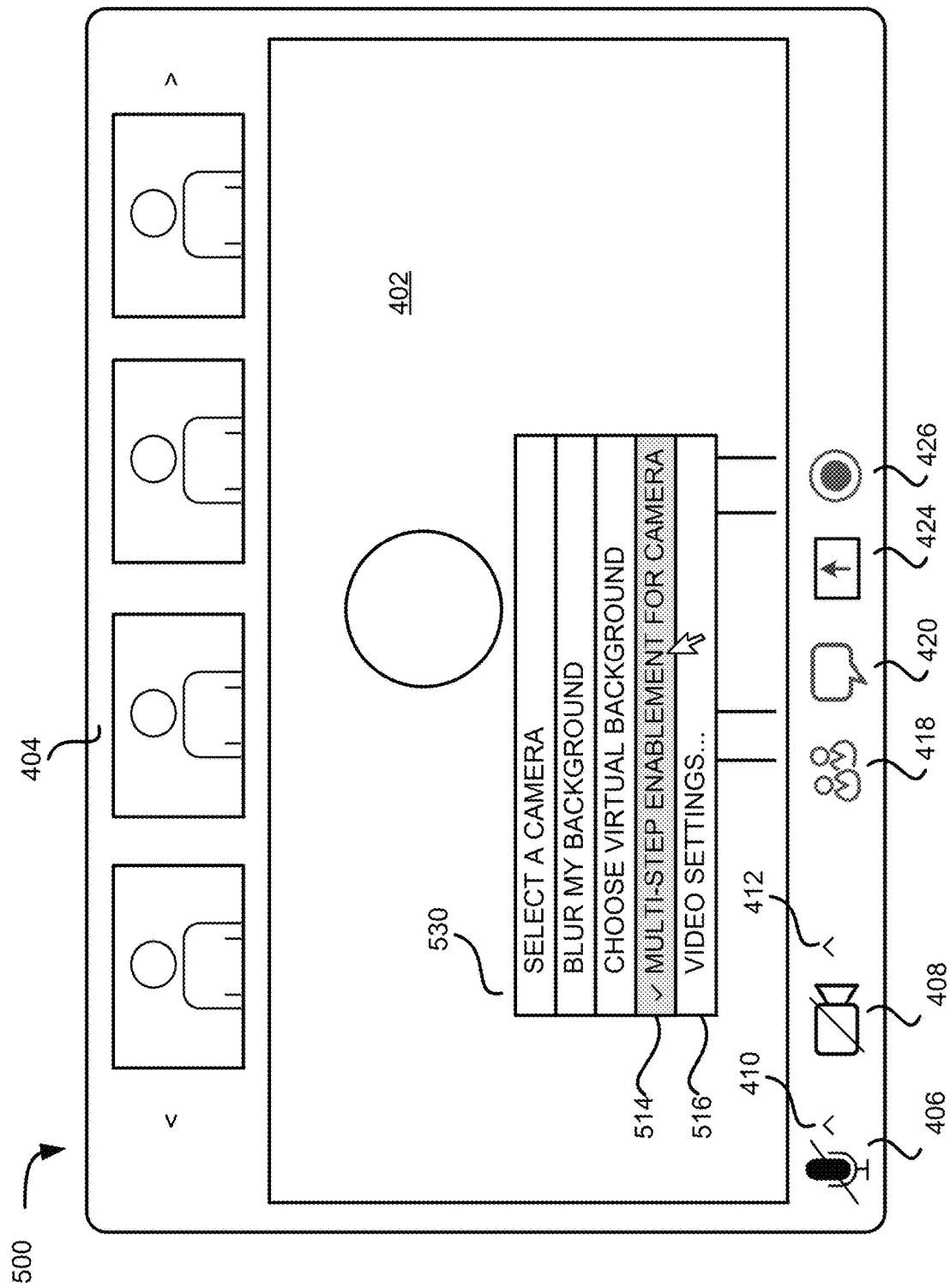
FIG. 5 is an example GUI of a video conferencing session showing that a setting of multi-step enablement for camera is activated.

Referring now to FIG. 5, FIG. 5 is an example GUI 500 of a video conferencing session showing that a setting of multi-step enablement for camera is activated. Most of the elements in GUI 500 are the same as in GUI 400 in FIG. 4. When the caret symbol 412 at the upper right corner of the camera button 408 is clicked, a dropdown menu 530 is shown including options for the camera. Option 514 can be toggled on or off for activating or deactivating the multi-step enablement for camera. When the option 514 is toggled as shown in FIG. 5, the multi-step enablement for camera is activated. That is, if the camera is disabled, more than one step is needed to re-enable the camera. Option 516 includes more settings for the camera. A user may select or set specific extra steps for re-enabling a disabled camera.

Figure 6:
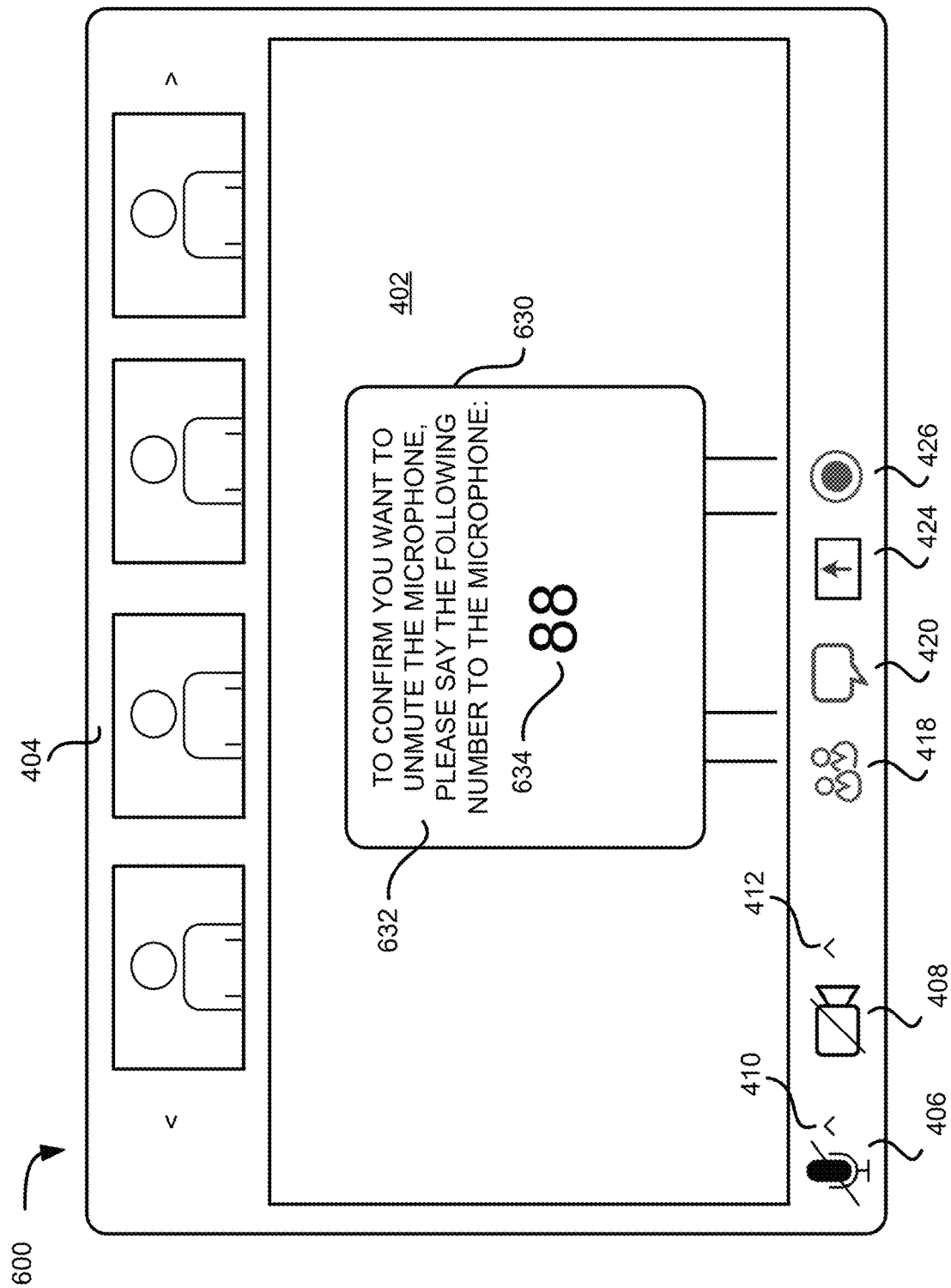
FIG. 6 is an example GUI of a video conferencing session showing an example extra step for unmuting a microphone.

Referring now to FIG. 6, FIG. 6 is an example GUI 600 of a video conferencing session showing an example extra step for unmuting a microphone. Most of the elements in GUI 600 are the same as in GUI 400 in FIG. 4. As shown in FIG. 4, the microphone button 406 is turned off, and the option 414 for multi-step enablement for microphone is toggled. A user of the GUI 600 may accidentally touch or click the microphone button 406, then an extra step for unmuting the microphone is generated and displayed in a popup window 630. The popup window 630 includes a prompt 632. In this example the prompt 632 says "to confirm you want to unmute the microphone, please say the following number to the microphone." Below the prompt 632, it is a randomly generated number 634, which is "88" in this example. If the user can say the randomly generated number 634 displayed in the popup window 630 correctly, the microphone can be unmuted for the user so that other participants in the video conferencing session can hear the audio from the user's microphone. Even though FIG. 6 shows an extra step is performed through a microphone to turn on the microphone, the microphone does not have to be enabled by an extra step performed through the microphone. Extra steps performed through other input devices, such as camera, keyboard, or touch screen, can also be used to receive the enabling input to enable the microphone. The GUI 600 may also or instead provide the user with the option to type in the displayed number, rather than speaking it aloud.

Figure 7:
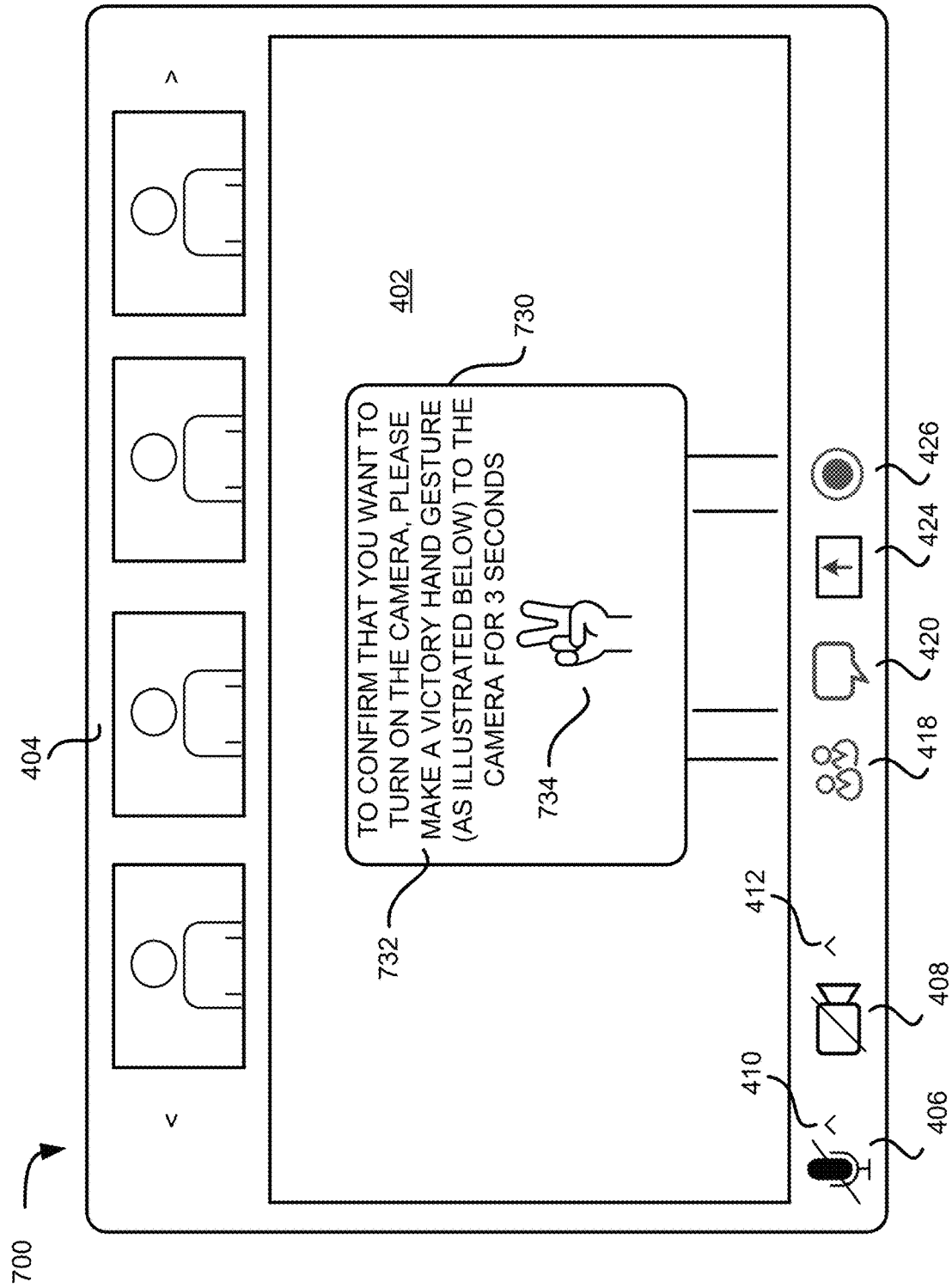
FIG. 7 is an example GUI of a video conferencing session showing an example extra step for enabling a camera.

Referring now to FIG. 7, FIG. 7 is an example GUI 700 of a video conferencing session showing an example extra step for enabling the camera. Most of the elements in GUI 400 are the same as in GUI 500 in FIG. 5. As shown in FIG. 5, the camera button 408 is turned off, and the option 514 for multi-step enablement for camera is toggled. A user may accidentally touch or click the camera button 408, then an extra step for enabling the camera is displayed in a popup window 730. The popup window 730 includes a prompt 732. In this example the prompt 732 says "to confirm you want to turn on the camera, please make a victory hand gesture (as illustrated below) to the camera for 3 seconds." Below the prompt 732, it is an illustration 734 showing a victory hand gesture in this example. If the user can show the victory hand gesture in front of the camera correctly, the camera can be enabled for the user so that other participants in the video conferencing session can see the user's camera view. Even though FIG. 7 shows an example of enabling a camera by performing an enabling step to the camera, other enabling steps through other input devices, such as microphone, keyboard, or touchscreen, can also be used for receiving the enabling input to enable the camera.

Figure 8:
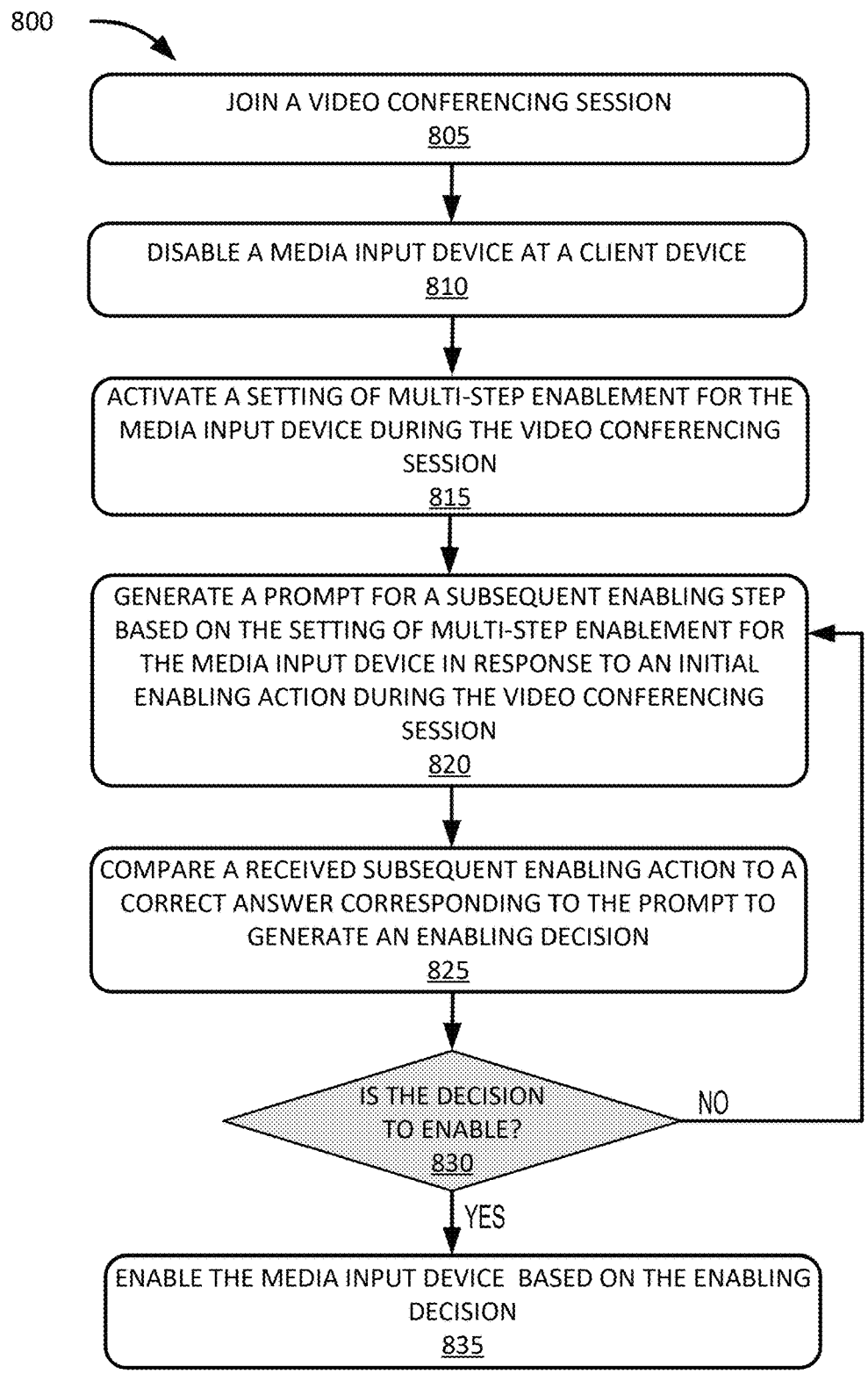
FIG. 8 shows an example method 800 for enabling a media input device configured with multi-step enablement during a video conferencing session.

Referring now to FIG. 8, FIG. 8 shows an example method 800 for enabling a media input device configured with multi-step enablement during a video conferencing session. The example method 800 will be discussed with respect to the system 300 shown in FIG. 3; however, any suitable system for enabling a media input device configured with multi-step enablement during a video conferencing session may be used.

At block 805, a client device 340 joins a video conferencing session. The video conferencing session can be established on the chat video conference provider 310 among two or more participants. The client device 340 can join the video conferencing session via a video conference application 350 installed on the client device 340 and provided by the chat video conference provider 310.

At block 810, the client device 340 disables a media input device at the client device 340. For example, the user of the client device 340 may select an option to disable the media input device or the client device 340 may be configured to automatically disable the media input device upon joining a video conferencing session. The media input device can be a microphone 380 or a camera 390, which can be connected to or embedded in the client device 340. The video conference application 350 installed on the client device 340 provides a GUI for the video conferencing session. The microphone 380 or the camera 390 can be disabled via a microphone button (e.g., button 406 in FIG. 4) or a camera button (e.g., button 408 in FIG. 4) in the GUI for the video conferencing session.

At block 815, the client device 340 activates a setting of multi-step enablement for the media input device during the video conferencing session. The customized media input management engine 360 of the video conference application 350 can set up extra steps for multi-step enablement for the media input device generally as described in FIG. 3. For example, the customized media input management engine 360 includes a setting for multi-step enablement of a microphone 380 or a camera 390 at the client device 340. A user associated with the client device 340 can activate the setting of multi-step enablement for the microphone 380 via a GUI element (e.g., a dropdown menu 430 in GUI 400) so that at least one extra step is needed to unmute the muted microphone 380 besides an initial step of clicking or touching a microphone button (e.g., microphone button 406). Similarly, the user associated with the client device 340 can activate the setting of multi-step enablement for the camera 390 via a GUI element (e.g., a dropdown menu 530 in GUI 500) so that at least one extra step is needed to enable the disabled camera 390 besides clicking or touching a camera button (e.g., camera button 408).

At block 820, the client device 340 generates a prompt for a subsequent enabling action in response to an initial enabling action during the video conferencing session. The customized media input management engine 360 of the video conference application 350 can generate a prompt for a subsequent enabling action in response to an initial enabling action, generally as described in FIG. 3. The initial enabling action can be a touch or click on a microphone button (e.g., the microphone button 406) or a camera button (e.g., a camera button 408) in the GUI of the video conference application 350, either intentionally or unintentionally. For example, a user muted the microphone during the video conferencing session and activated the setting of multi-step enablement. If a user inadvertently touches the microphone button (e.g., 406 in GUI 400), it triggers the customized media input management engine 360 to generate a prompt for a subsequent enabling action. The prompt can be a visual prompt displayed in the GUI on the client device 340. Alternatively, or additionally, the prompt can be an audio prompt that can be played by the client device 340 to the associated user. For instance, as illustrated in FIG. 6, the prompt is a visual prompt stating "to confirm you want to unmute the microphone, please say the following number to the microphone: 88."

At block 825, the client device 340 compares a received subsequent enabling action to a reference answer corresponding to the prompt to generate an enabling decision. The user associated with client device 340 may perform a subsequent enabling action according to the prompt display or played on the client device 340. Following the example above, when the user reads the prompt as "to confirm you want to unmute the microphone, please say the following number to the microphone: 88," the user may say "88" to the microphone 380 associated with client device 340. The customized media input management engine 360 receives the sound signals from the microphone 380. The customized media input management engine 360 can compare the received subsequent enabling action to a reference answer corresponding to the prompt to generate an enabling decision.

At block 830, the client device 340 determines if the enabling decision is to enable the media input device. If the received subsequent enabling action matches the reference answer, the enabling decision is to enable the media input device. The process 800 then proceeds to block 835. If the received subsequent enabling action does not match the reference answer, the enabling decision is not to enable the media input device. The enabling decision can be displayed in the GUI indicating it is incorrect subsequent enabling action. If the user did not intend to unmute the microphone 380, the microphone remains muted. If the user intends to unmute the microphone 380, the user may elect to try again. Then the process 800 goes back to block 820, a new prompt is generated and displayed following another initial enabling action (e.g., clicking or touching the camera button or the microphone again). Alternatively, the user may not wish to activate the media input device and may cancel the enablement process.

At block 835, the client device 340 enables the media input device based on the enabling decision. If the received subsequent action matches the reference answer corresponding to the prompt, the customized media input management engine 360 generates an enabling decision to enable the media input device. The customized media input management engine 360 then enables the media input device. In some examples, before the customized media input management engine 360 enables the camera 390 based on the enabling decision, a camera view can be displayed in the GUI of the video conferencing session so that the user can adjust and confirm the camera view.

Even though generally the customized media input management engine 360 in the video conference application 350 performs the actions described at blocks 815-835, the media input management engine 320 on the chat video conference provider 310 can also or instead perform some or all of the actions at blocks 815-835.

Figure 9:
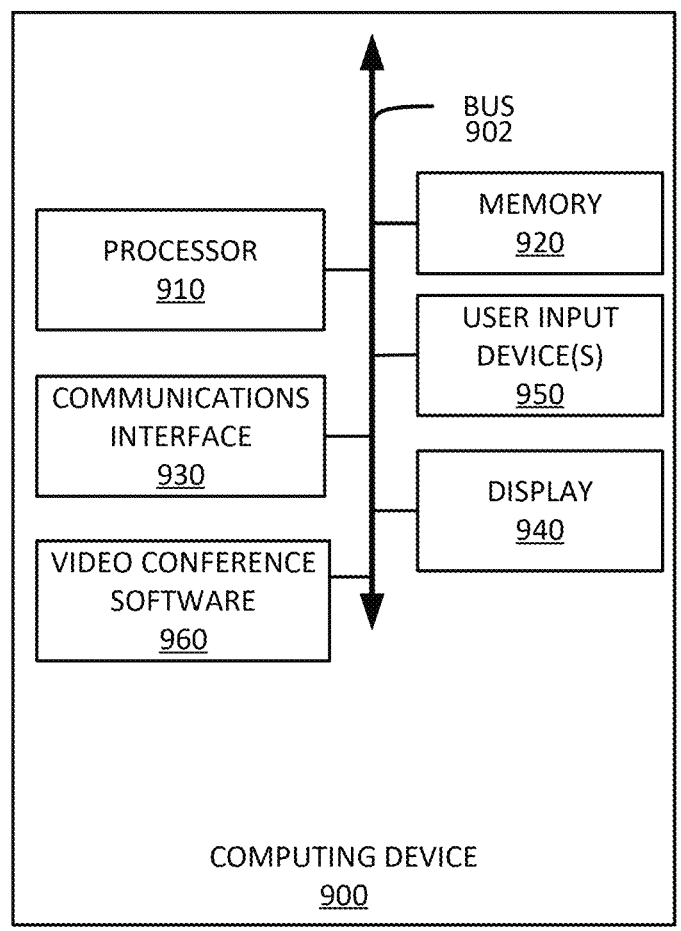
FIG. 9 shows an example computing device suitable for use with example systems and methods for enabling a media input device configured with multi-step enablement during a video conferencing session.

Referring now to FIG. 9, FIG. 9 shows an example computing device 900 suitable for use in example systems or methods for enabling a media input device configured for multi-step enablement according to this disclosure. The example computing device 900 includes a processor 910 which is in communication with the memory 920 and other components of the computing device 900 using one or more communications buses 902. The processor 910 is configured to execute processor-executable instructions stored in the memory 920 to perform one or more methods for enabling a media input device configured for multi-step enablement according to different examples, such as part or all of the example method 800 described above with respect to FIG. 8. In some embodiments, the computing device may include software 960 for executing one or more methods described herein, such as for example, one or more steps of method 800. The computing device 900, in this example, also includes one or more user input devices 950, such as a keyboard, mouse, touchscreen, microphone, etc., to accept user input. The computing device 900 also includes a display 940 to provide visual output to a user.

The computing device 900 also includes a communications interface 930. In some examples, the communications interface 930 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random-access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
joining, by a client device, a video conferencing session;
disabling, by the client device, a media input device at the client device;
activating, by the client device, a setting of multi-step enablement for the media input device during the video conferencing session;
generating, by the client device, a prompt for a subsequent enabling action based on the setting of multi-step enablement for the media input device in response to an initial enabling action during the video conferencing session;
receiving, by the client device, a subsequent enabling action;
comparing a received subsequent action to a reference answer corresponding to the prompt to generate an enabling decision; and
enabling the media input device in response to the enabling decision if the received subsequent action matches the reference answer corresponding to the prompt.

2. The method of claim 1, wherein the media input device comprises a microphone or a camera, and wherein the initial enabling action comprises clicking or touching a control button for the microphone or camera.

3. The method of claim 1, further comprising generating a second prompt for a second subsequent enabling action if the received subsequent action matches the reference answer corresponding to the prompt.

4. The method of claim 1, wherein the prompt is a visual prompt, and wherein the method further comprises causing the visual prompt to be displayed via a graphical user interface (GUI) of the client device.

5. The method of claim 1, wherein the prompt is an audio prompt, and wherein the method further comprises causing the audio prompt to be played on the client device.

6. The method of claim 1, wherein the prompt for the subsequent enabling action comprises a Completely Automated Public Turing Test to tell Computers and Humans Apart (CAPTCHA) question.

7. The method of claim 1, wherein the prompt for the subsequent enabling action comprises a request for drawing a particular pattern.

8. The method of claim 1, wherein the prompt for the subsequent enabling action comprises a request for typing a particular code.

9. The method of claim 1, wherein the prompt for the subsequent enabling action comprises a security question preselected by a user associated with client device.

10. The method of claim 1, wherein the prompt for the subsequent enabling action comprises a request for showing particular information in front of a camera associated with the client device, and wherein the particular information comprises a gesture, a movement, a facial expression, an object, a written symbol, a written number, or a written word.

11. The method of claim 1, wherein the prompt for the subsequent enabling action comprises a request for making a particular sound pattern to a microphone associated with client device.

12. The method of claim 1, wherein the media input device is a camera, wherein
the method further comprises:
causing a camera view to be displayed on the client device prior to enabling the camera based on the enabling decision; and
requesting a confirmation input for the camera view.

13. A system comprising:
a communications interface;
a non-transitory computer-readable medium; and
one or more processors communicatively coupled to the communications interface and the non-transitory computer-readable medium, the one or more processors configured to execute processor-executable instructions stored in the non-transitory computer-readable medium to:
join a video conferencing session;
disable a media input device at a client device;
activate a setting of multi-step enablement for the media input device during the video conferencing session;
generate a prompt for a subsequent enabling action based on the setting of multi-step enablement for the media input device in response to an initial enabling action during the video conferencing session;
compare a received subsequent action to a reference answer corresponding to the prompt to generate an enabling decision; and
enable the media input device in response to the enabling decision if the received subsequent action matches the reference answer corresponding to the prompt.

14. The system of claim 13, wherein the prompt is a visual prompt, and wherein the one or more processors are configured to execute further processor-executable instructions stored in the non-transitory computer-readable medium to:
cause the prompt to be displayed via a graphical user interface (GUI) of the client device.

15. The system of claim 13, wherein the prompt is an audio prompt, and wherein the one or more processors are configured to execute further processor-executable instructions stored in the non-transitory computer-readable medium to:
causing the audio prompt to be played on the client device.

16. The system of claim 13, wherein the media input device is a camera, wherein the one or more processors are configured to execute further processor-executable instructions stored in the non-transitory computer-readable medium to:
cause a camera view to be displayed on the client device prior to enabling the camera based on the enabling decision; and
request a confirmation input for the camera view.

17. A non-transitory computer-readable medium comprising processor-executable instructions configured to cause one or more processors to:
join a video conferencing session;
disable a media input device at a client device;
activate a setting of multi-step enablement for the media input device during the video conferencing session;
generate a prompt for a subsequent enabling action based on the setting of multi-step enablement for the media input device in response to an initial enabling action during the video conferencing session;
compare a received subsequent action to a reference answer corresponding to the prompt to generate an enabling decision; and
enable the media input device in response to the enabling decision if the received subsequent action matches the reference answer corresponding to the prompt.

18. The non-transitory computer-readable medium of claim 17, wherein the prompt for the subsequent enabling action comprises a request for drawing a particular pattern, a request for typing a particular code, or a security question reselected by a user associated with the client device.

19. The non-transitory computer-readable medium of claim 17, wherein the prompt for the subsequent enabling action comprises a request for showing particular information in front of a camera associated with the client device, and wherein the particular information comprises a gesture, a movement, a facial expression, an object, a written symbol, a written number, or a written word.

20. The non-transitory computer-readable medium of claim 17, wherein the prompt for the subsequent enabling action comprises a request for making a particular sound pattern to a microphone associated with client device.

* * * * *